US006775541B2

(12) United States Patent
Dillon et al.

(10) Patent No.: US 6,775,541 B2
(45) Date of Patent: Aug. 10, 2004

(54) METHOD AND APPARATUS FOR CONTROLLING DATA RATES TO PRESERVE VOICE QUALITY IN A CDMA SYSTEM

(75) Inventors: Matthew J. Dillon, Oxfordshire (GB); Bogdan R. Nedelcu, North Barrington, IL (US)

(73) Assignee: Motorola, Inc., Schaumburg, IL (US)

( * ) Notice: Subject to any disclaimer, the term of this patent is extended or adjusted under 35 U.S.C. 154(b) by 569 days.

(21) Appl. No.: 09/766,196

(22) Filed: Jan. 19, 2001

(65) Prior Publication Data

US 2002/0137520 A1 Sep. 26, 2002

(51) Int. Cl.[7] .............................................. H04Q 7/20
(52) U.S. Cl. .................................. 455/422.1; 370/229
(58) Field of Search ............................. 455/453, 67.1, 455/512, 513, 522, 434, 452.1, 69, 67.11, 422.1, 452.2; 370/328, 329, 332, 335, 342, 230, 235, 236, 230.1

(56) References Cited

U.S. PATENT DOCUMENTS

| 5,245,629 | A | * | 9/1993 | Hall | 371/1 |
|---|---|---|---|---|---|
| 6,058,107 | A | * | 5/2000 | Love et al. | 370/332 |
| 6,064,659 | A | | 5/2000 | Rohani et al. | |
| 6,128,506 | A | | 10/2000 | Knutsson et al. | |
| 6,621,804 | B1 | * | 9/2003 | Holtzman et al. | 370/329 |

OTHER PUBLICATIONS

Chen Nee Chuah et al.: "*Integrated dynamic 1–10 radio resource management*", Vehicular Technology Conference, 1995 IEEE 45th Chicago, IL, USA Jul. 25–28, 1995, New York, NY, USA IEEE, US Jul. 25, 1995, pp. 584–588.

* cited by examiner

*Primary Examiner*—Nay Maung
*Assistant Examiner*—Angelica M. Perez

(57) ABSTRACT

A method of protecting voice calls in danger of being dropped from a cell of a wireless communication system due to high speed data users. The method including the steps of calculating a signal-to-noise ratio based upon a forward link of each of the plurality of traffic channels within the cell and detecting when the cell is in a overload condition. The method further determines the gain associated with each traffic channels within the cell as well as the channels associated priority level. The method then reduces the gain on the traffic channels with the lowest priority to save the voice call from being disconnected.

13 Claims, 3 Drawing Sheets

METHOD AND APPARATUS FOR CONTROLLING DATA RATES TO PRESERVE VOICE QUALITY IN A CDMA SYSTEM

FIELD OF THE INVENTION

The present invention relates generally to voice and data call prioritization in a mobile communication system, and more particularly to a method and apparatus for prioritizing voice and data calls within a Code Division Multiple Access (CDMA) mobile telephony system which allows an enhanced Radio Frequency (RF) loss reduction for voice calls.

BACKGROUND ART

This invention relates to the protection of voice calls in a wireless cellular telecommunications system where voice and data services are permitted. More specifically the voice protection technology may be applied in spread spectrum, or code division multiple access (CDMA) systems operating according to Telecommunications Industry Association standard specified as "IS-95B." Furthermore, the present invention may also be applied to any Third Generation Partnership Projects (3GPP) Universal Mobile Telecommunications System (UMTS) specification.

In a typical CDMA environment, unique digital codes, rather than RF frequencies, are used to differentiate subscribers. During a call, a user is assigned a binary, Direct Sequence code, and that users'0 information data stream is impressed upon a much-higher-bit-rate data stream. The digital codes are shared by both the mobile station (cellular phone) and the base station, and are called "pseudo-Random Code Sequences."0 All users, therefore, are able to share the same range of radio spectrum. Each of the coded information signals overlaps all other coded signals and all signals are transmitted as modulations of radio frequency carrier waves, jointly received as a composite signal at a receiver. By utilizing the shared digital code at the receiver, the composite signal can be isolated and decoded.

In order to reduce interference between different call connections and to maintain sufficient communication link quality and data throughput, transmission power levels may be manipulated at both the base stations and the mobile stations. Preferably, the transmission power levels operate at the minimum level in order to maintain satisfactory mobile service and maximize system capacity. Reverse link power control varies the power level of the reverse communications link (mobile unit to base station), while forward-link power control varies the power level of the forward communications link (base station to mobile unit).

As the number of users transmitting information increases, the interference between the users' signals also increases and transmission quality suffers as a result. The interference associated with increased cell usage within a CDMA system can be easily understood by analogy to a cocktail party. CDMA technology can be likened to a large, single room with a large number of people, in pairs, who wish to carry on a conversation. The people in the room only wish to talk to each other, and are uninterested in the conversations of the others in the room. If each pair in the room speaks a language that only they can understand, each pair is able to carry on a conversation while experiencing little or no interference from the other conversations. The analogy is that the air in the room is a wideband carrier, and the languages are represented by the "codes"0 assigned by the CDMA system.

As the number of people carrying on a conversation in the room increases, the background noise in the room (interference from other users) also increases, making it more difficult for the pairs to understand each other (frame erasure rates get too high). Likewise, as the distance between the pairs increases, the more likely it is that the background noise of the room will interfere with the pairs conversation. By controlling the voice volume (signal strength) of all the participants to a level no more than necessary, the number of conversations which can take place in the room can be maximized.

In such systems where voice and data signals can be simultaneously transmitted over the air on the same channels, forward link power control typically uses forward link quality information feedback transmitted on reverse links to update forward link power levels. This feedback information can be in the form of bits used to indicate whether an individual forward link traffic channel frame was erased. This information can also be in the form of a transmitted message used to indicate that some number of forward link frames were erased during a given time span. Reverse channel power control currently uses a method in communication systems, such as a CDMA system, whereby a power control group is transmitted from the mobile communication unit and received by the base station. The base station compares the energy of the power control group to a set point threshold and instructs the mobile communication unit on a forward link to power up or power down as necessary by transmitting a power adjustment command to the mobile or remote unit.

Under normal conditions, this type of closed loop power control will result in sufficient power levels that maintain an interference or noise level of the receive signal at a substantially fixed and acceptable level. However, a call initiated by a remote high speed data (HSD) user within a given sector or cell causes interference that can deteriorate signal quality for other users including both voice and data calls occurring within the cell and neighboring cells. These other users typically operate at minimum necessary power levels. The HSD user transmits at a significantly higher power level. When the cell is at or near maximum capacity (overload condition), the high speed data transmission interferes with the other users in the cell, and especially impacts the voice transmissions of users who are furthest away from the BTS. This interference can result in unacceptable lost voice call and/or degraded service quality.

Current congestion control technology allows for the degradation in the frame erasure rate (FER) of all transmission signals or pilot carrier signal power when the linear power amplifier (LPA) is at maximum allowable power. Other congestion control implementations limit the number of available supplemental channels, or alternatively, the data rates for supplemental channels based on cell load criteria, (i.e., total forward power with respect to LPA allotment). These methods do not allow for a single mobile unit to trigger congestion relief, and therefore, both data and voice users are given equal preference after receiving a transmission channel. The net result of these congestion control technologies is that a few data users can monopolize a cell and effectively lock out voice users, or degrade voice user service so as to cause the voice call to be dropped, ultimately resulting in user dissatisfaction.

Thus there is a need for a congestion control technology which protects voice calls that are in imminent danger of being dropped by reducing the amount of interference to the voice user by the data user.

BRIEF DESCRIPTION OF THE DRAWINGS

The features and advantages of the present invention will become more apparent from the following detailed description of the preferred embodiments of the invention taken in conjunction with the drawings.

DESCRIPTION OF THE PREFERRED EMBODIMENT

The present invention provides a method and apparatus that addresses the above-mentioned problems by protecting voice calls that are in danger of suffering a service degradation within one or more cells or sectors of a wireless communication system from increased interference levels caused by a high speed data (HSD) transmission in a particular cell. The method generally involves identifying the signal to noise ratio of the particular cell of the system and determining whether the cell is an overload condition (i.e., the signal to noise ratio is too low). The method also involves identifying each of the present users in communication with a particular cell of the system and each user's present gain (power level). The method includes the association of a priority level to each user identified. The method further includes the determination of whether the cell is in an overload condition, and whether there are voice users who are at the maximum gain level. The method includes reducing the gains of non-priority users until the cell recovers from an overload situation, or until the voice call in danger is either saved or lost. The method may be implemented at the base transceiver station or base transceiver station's controller, depending upon the location of the power control gain information in the wireless communication system. The method may be further implemented on a computer system located at the appropriate location detailed below. It will be noted, however, that while the description of the preferred embodiment detailed below references a CDMA cellular system, it will recognized by those skilled in the art that the present invention may be applied to any third generation cellular system, including 3GPP UTMS specifications.

Figure 1:
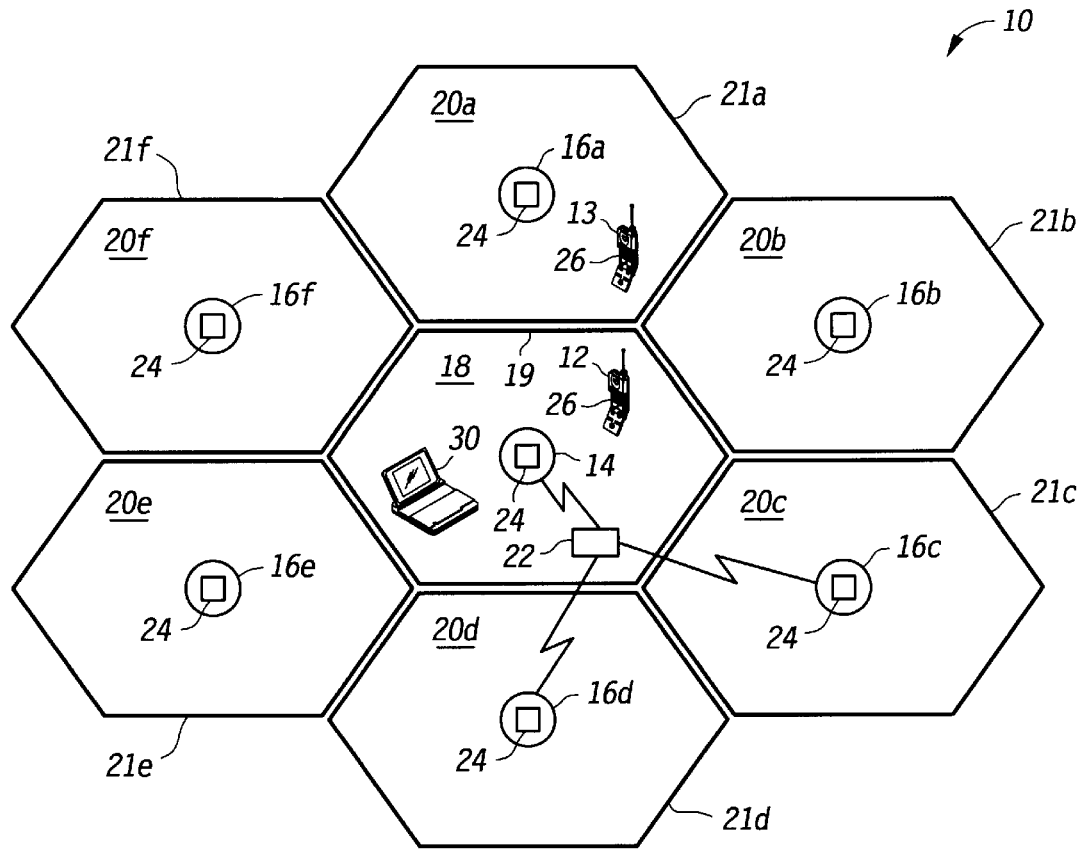
FIG. 1 is a diagram of a typical wireless communication system suitable for use in accordance with the teachings of the present invention.

Referring now to the drawings, FIG. 1 illustrates a block diagram of a typical wireless communication system constructed according to the teachings of the present invention and for which the method of the invention is particularly well suited. The communication system 10 has mobile users or units 12 and 13, a first base transceiver station (BTS) 14, and a plurality of surrounding or neighboring base transceiver stations (NBTS) 16a–16f. As generally depicted in FIG. 1, the mobile unit 12 resides at a given time in one cell or sector 18 of the system 10 defined by a boundary range or area 19 that is served by the BTS 14. Each of the NBTS 16a–16f separate respective cell 20a–20f adjacent the cell 18 that are defined by respective boundaries 21a–21f. A centralized base station controller (CBSC) 22 is in communication with the BTS 14 and the several NBTS 16 of the communication system.

The system 10 will typically have a large number of mobile users or units 12 and 13 and a plurality of BTSs spread over an area served by the overall system as is known in the art. For convenience of illustration, FIG. 1 only shows two mobile units 12 and 13 and a relatively small number of BTSs including the BTS 14 and the several NBTS 16. Also as in known in the art, the mobile user or units 12 and 13 represent a cellular telephone that can travel with a system user throughout the various cells of the system. The mobile units 12 and 13 can also represent other types of data devices such as a wireless data terminal or phone, video phone, or the like. These types of units transmit data and/or voice signals over the several BTSs of the communication system.

The type of communication system 10 as represented in FIG. 1 can vary within the scope of the present invention, but in one example is a Code Division Multiple Access (CDMA) or CDMA 2000 system as is known in the art. In a preferred embodiment, the CDMA system is a third generation (3G) cellular CDMA system utilizing forward power control such as an Interim Standard 95B (IS-95B) system that uses forward link quality information feedback transmitted on reverse links to update forward link power levels. However, the system 10 may also be any communication system that transmits signaling messages and requires accurate delivery and receipt by mobile stations or units 12 and 13. The BTS 14 and the several NBTS 16 each include a transceiver 24 that has a transmitter and a receiver. The transceiver 24 transmits over-the-air (OTA) radio frequency (RF) signals to be received by the mobile units 12 and 13. This type of transmission is well known in the art and will not be described in any greater detail herein. Transceivers 24 receive messages from the mobile unit 12, also by means well known in the art.

Each mobile unit 12 and 13, has a transceiver 26 including a transmitter and receiver. The mobile units 12 and 13 communicate with a BTS by transmitting messages via the transceiver 26 on reverse links, and receives messages via the transceiver 26 that are generated by the BTS on forward links. In one embodiment of the invention, the BTS 14 and NBTS 16 act as their own power control manager in the system 10. Alternatively, the CBSC 22 can be adapted to manage power control for the entire system 10.

Also illustrated in FIG. 1 is a third mobile user or unit 30 that is a wireless data terminal, whether a telephone or another device, capable of transmitting high speed data (HSD) in contrast to merely transmitting voice signals over the communication system. The mobile unit 30 transmits data, whether by upload or download, HSD over the communication system. Such data transmission requires relatively high power consumption and is sent at very high data rates or speeds. Voice transmissions can tolerate some amount of error given the nature of the human ear, whereas data transmissions cannot. Each bit of data must be properly sent and received or the data transmission will not be successful.

In the present invention, if the mobile unit 12 is transmitting and receiving signals in the cell 18 served by the BTS 14, the mobile unit 12 requires a minimum power level to satisfactorily transmit and receive messages. The necessary power level depends on a number of variables. If a small number of voice users are presently transmitting, the required power level for each is relatively low. If a larger number of users are transmitting at a given time, each of the mobiles will be operating at a higher power level to overcome the interference generated by the multiple users. Data users operating in the same cell will also require all users to transmit at greater power levels to overcome the interference.

Voice units operate on dedicated fundamental channels typically at lower data rate, lower power levels in CDMA communication systems. In a system such as a 3G CDMA system, additional supplemental channels are also provided for transmitting and receiving higher power, higher speed data rate signals. The present invention is directed to overcoming the interference problem created when the HSD mobile unit 30 is transmitting on a supplemental channel in cell 18, and wherein one or more mobile units 12 are also transmitting in the same cell (unit 12) or neighboring cells (unit 13).

Figure 2:
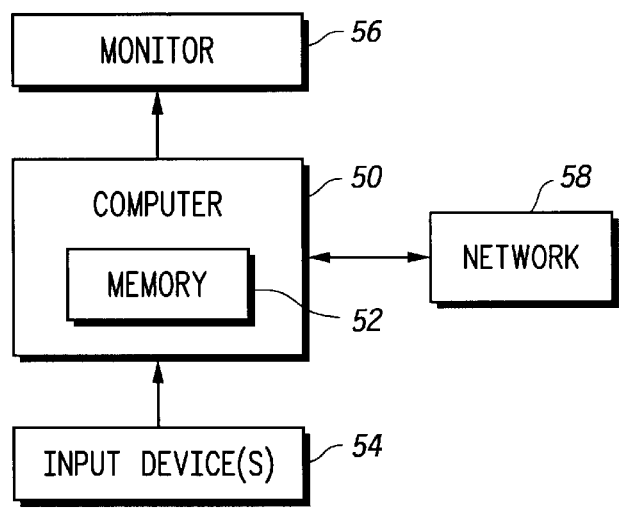
FIG. 2 is a block diagram of a computer system which may be used to implement the present invention.

The method of the present invention may be implemented at the BTS 14, for example, by the computer 50 shown in FIG. 2 having internal memory 52, input device(s) 54, such as a keyboard and mouse, a monitor 56, and a network connection 58 to the BTS 14. Generally, the computer 50 executes programming stored in a computer-readable memory, such as the memory 52 or a hard drive or other storage device [not pictured], to implement the present invention as described hereinafter.

Figure 3:
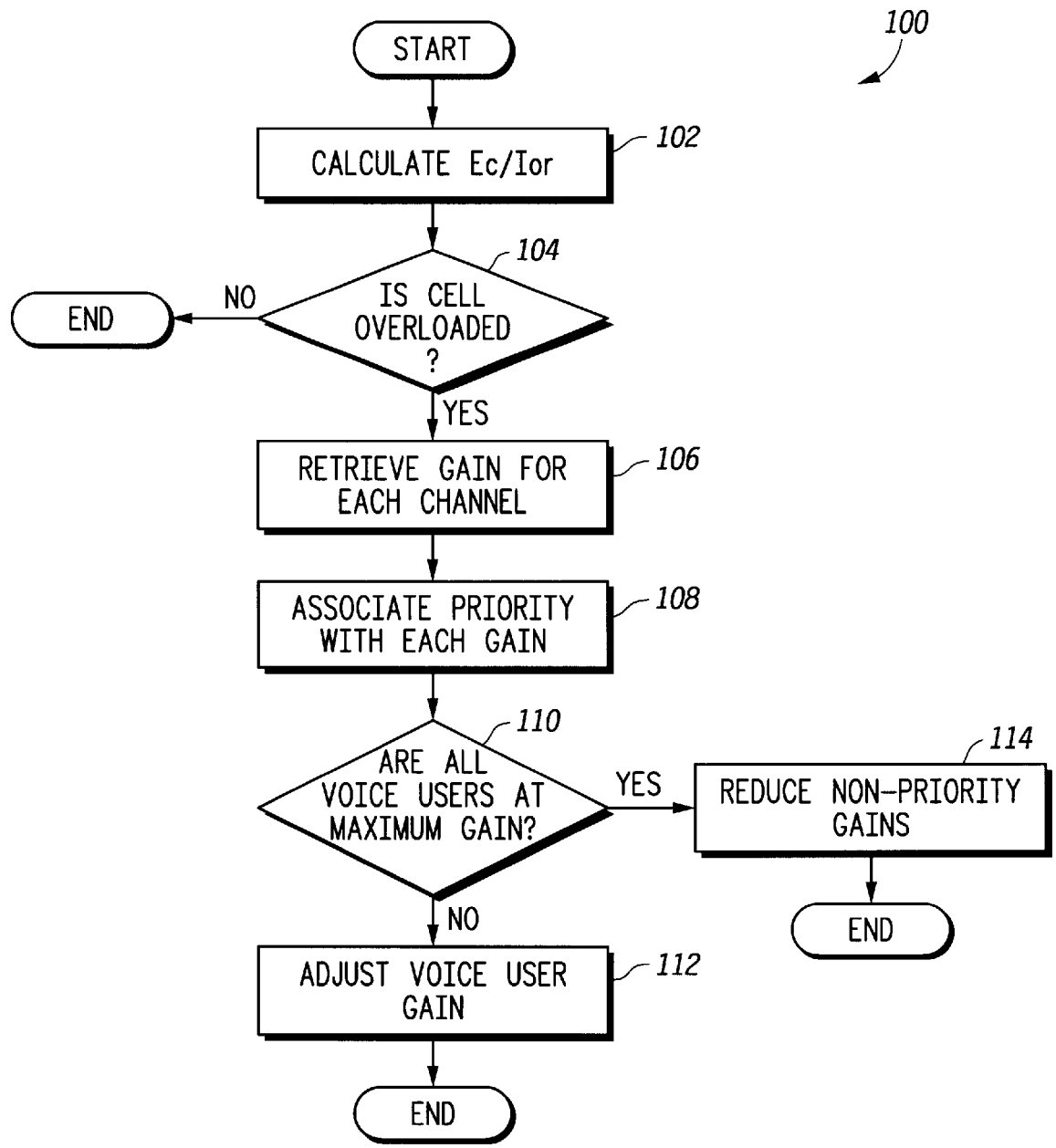
FIG. 3 is a flow chart of a process according to one example of the present invention for protecting voice calls that are in danger of suffering a service degradation within one or more wireless communication cells.

FIG. 3 illustrates a flow diagram 100 of one example of a method according to the teachings of the present invention for ensuring voice connectivity by voice call prioritization in a mobile communication system. Although the flow diagram is directed to a voice call prioritization, it will be recognized that the method of voice call prioritization may be easily adapted to prioritize any number of mobile communication types, for example Internet or file transfer (FTP) communications. The method is intended to be implemented within each BTS 14, or alternatively, within the CBTS 22, to allow the BTS 14, or CBTS 22, to control the connectivity within the cell(s) it is responsible for overseeing.

At a step 102, the communications system determines whether a voice call is in danger of being dropped from the cell. The step 102 calculates the signal to noise ratio, $E_c/I_{or}$, where $E_c$ is the Energy per chip, and $I_{or}$ is the Interference Spectral Density. $E_c/I_{or}$ is calculated as:

$$E_c/I_{or} = (G_{pilot})^2 / (3G_{common-channels}^2 + 3G_{TCH}^2)$$

where $G_{pilot}$, $G_{common-channels}$, and $G_{TCH}$ are the gain on the pilot channel, the common channels and the traffic channels respectively. Each gain is stored within the BTS 14 and is examined every frame, or approximately 100 times per second and therefore, $E_c/I_{or}$ is calculated every frame as well.

Once $E_c/I_{or}$ is calculated at the step 102, a step 104 examines the $E_c/I_{or}$ value to determine if the cell is in an overload condition. To determine whether the cell is in an overload condition, the $E_c/I_{or}$ value is compared to a predetermined acceptable signal to noise ratio. If the step 104 determines the calculated $E_c/I_{or}$ value is greater than the acceptable signal to noise ratio, the cell is not overloaded and the process is terminated. If, however, the step 104 determines the calculated $E_c/I_{or}$ value is less than the acceptable signal to noise ratio, the cell is overloaded and the process continues on to a step 106, which retrieves the gain on each channel within the cell. The step 106 polls the gains stored within the BTS 14 and creates a list of all the gains associated with the current cell activity (i.e., for each traffic channel).

After the step 106 retrieves the gain for each traffic channel within the cell, a step 108 associates a priority with each gain. In the preferred embodiment, the priority levels are spread over a scale, for example one to ten, with one being those services with the highest save priority and ten being those services with the lowest save priority. For example, voice calls may be assigned a priority level of one, while Internet calls may be assigned a priority level of five, and FTP calls may be given the lowest priority level of ten. It should be recognized by those skilled in the art that although the preferred embodiment places the highest priority on voice calls, the system is configureable to prioritize services in any order (for example, FTP calls may be given the highest priority, while voice calls may be given a lower priority). Furthermore, the priority scale can be any suitable scale and should not be limited to a scale of one to ten, as long as priority levels can be differentiated and ranked.

Upon the association of priorities with each traffic channel by the step 108, a step 110 determines if there are traffic channels carrying voice users which are not at maximum gain. If the step 110 determines there are voice call traffic channels which are not at maximum gain, the step 112 raises the gain on those traffic channels, and the process is terminated. If, however, the step 110 determines all the voice user traffic channels are at maximum gain, a step 114 will reduce non-priority gains on other traffic channels as described below. After the non-priority traffic channel gains are reduced, the process is terminated.

Figure 4:
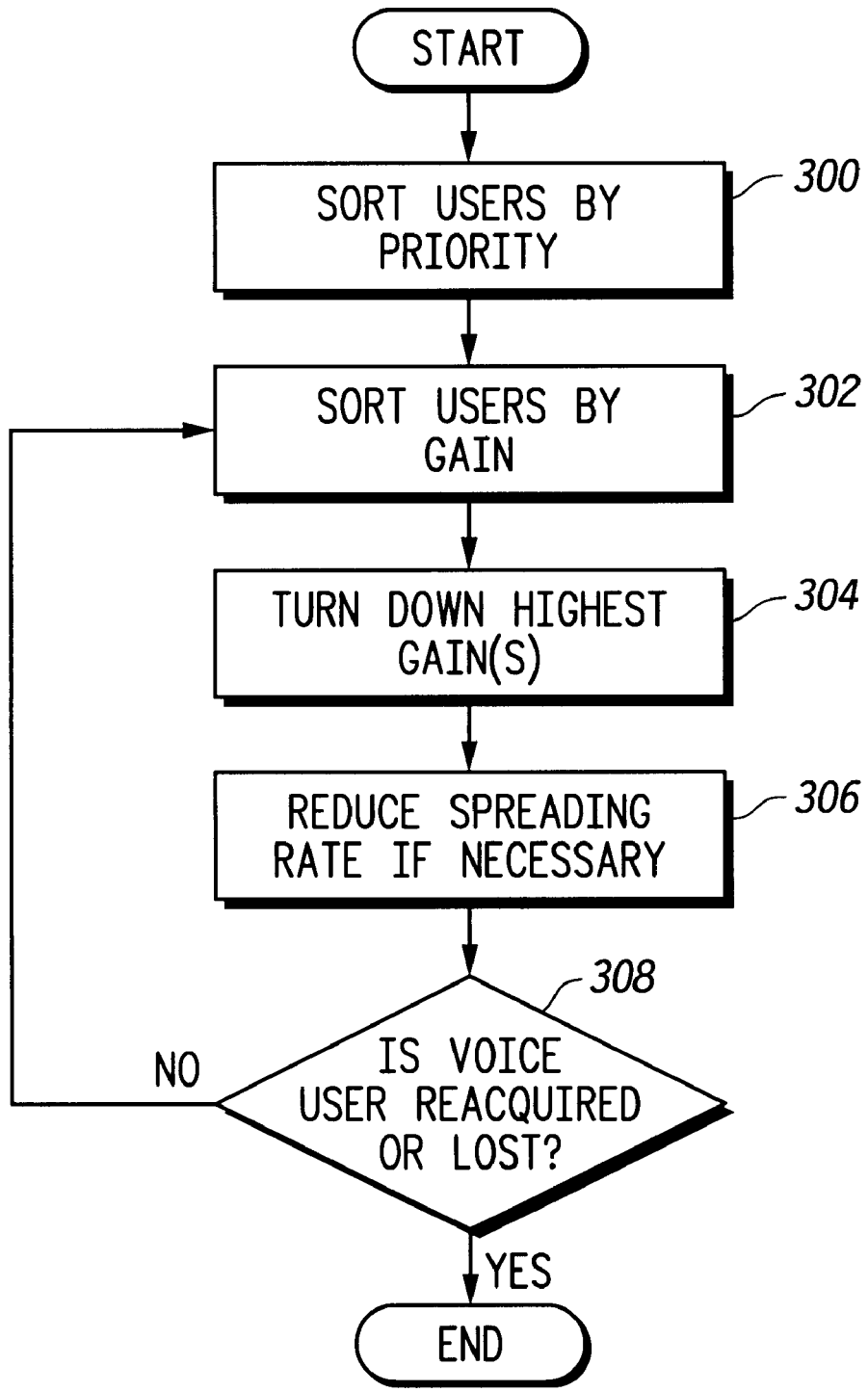
FIG. 4 is a flow chart of steps taken in accordance with the non-priority reduction step illustrated in FIG. 3 according to the present invention.

Turning to FIG. 4, there is shown in detail the method of reducing non-priority traffic channel gains utilized by the step 114 according to the present embodiment. The process begins at a step 300 with the sorting of all traffic channels by the priority associated with by the step 108. For example, all high priority level traffic channels will be grouped together, followed by the next lowest priority level traffic channels in order. Continuing on to a step 302, each priority level will in turn be sorted by the gain associated with each traffic channel.

Once the sorting steps 300 and 302 are complete, process control passes to a step 304 which reduces the gain on the lowest priority level traffic channels which have the highest gains. For example, if three traffic channels, A, B, and C are all of the service type which is associated with the lowest priority level, and traffic channel B has a higher gain than either traffic channel A or C, the step 304 will reduce the gain on channel B. If, however, there are multiple traffic channels with the same highest gain, then the step 304 will reduce all those channels equally.

After reduction of the highest gains by the step 304, a step 306 will notify the Medium Access Control Layer (MAC), an architectural layer of a known cellular network, to reduce the spreading rate, where applicable, on the traffic channels which had their gain reduced. Spreading rates are reduced by the step 306 only on those traffic channels that are capable of having their spreading rates changes (i.e, only data traffic channels). For example, where a traffic channel whose spreading rate is 10 Kbps, (i.e., a FTP traffic channel), has its gain reduced, the step 306 may cause the MAC to reduce the channels spreading rate to 5 Kbps.

The process then determines whether the voice user(s) is (are) still in danger of being dropped from the cell at a step 308, (i.e., the voice user has been reacquired, dropped, or passed to another cell). If the voice user is still in danger of being dropped, the process returns to the step 302 and steps 302 through 306 are repeated. If the voice call user is no longer in danger of being dropped, the process terminates.

The following table is illustrative of the effect of a HSD user on the overall $E_c/I_{or}$ value of a loaded cell. The power associated with each channel is converted to a gain to allow for $E_c/I_{or}$ calculations. This conversion is well known in the art and will not be described in any detail herein. As can be seen from the table, the loss of a single HSD user can dramatically decrease the $E_c/I_{or}$ ratio, in this example by 1.5 dB. A 1.5 dB change in the $E_c/I_{or}$ ratio, may allow a voice user in danger of being dropped from the system to be quickly recovered.

|  | With HSD User | | Without HSD User | |
| --- | --- | --- | --- | --- |
| | power (watts) | No. of users | total power (watts) | No. of users | total power (watts) |
| Pilot | 1.0 | 1 | 1 | 1 | 1 |
| Page/Sync | 0.85 | 1 | 0.85 | 1 | 0.85 |
| Voice Users | 0.2 | 60 | 12 | 60 | 12 |
| HSD User | 5.8 | 1 | 5.8 | 0 | 0 |
| Total Forward Power | | | 19.65 | | 13.85 |
| $E_c/I_{or}$ | | | −12.9336255 | | −11.4145 |

While the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

We claim:

1. A method of protecting calls in danger of being dropped from a cell of a wireless communication system, the cell having a pilot channel, a plurality of common channels, and a plurality of traffic channels, each of the pilot, common and traffic channels having a gain, a priority level, and a spreading rate, the method comprising the steps of:

calculating a signal-to-noise ratio as a square of the gain on the pilot channel divided a sum of the squares of all gains on the common channels and of all gains on the traffic channels;

determining whether the cell is in an overload condition, based upon the signal-to-noise ratio; and in the presence of an overload condition:
 determining the value of the gain associated with each of the
plurality of traffic channels within the cell;
 determining the priority level associated with each of the
plurality of traffic channels with the cell;
 determining whether each of the plurality of traffic channels
associated with the highest priority is below a maximum gain level; and
 increasing the gain of each of the plurality of traffic channels if determined to be below the maximum gain level, otherwise, if no traffic channel is determined to be below the maximum gain level, reducing the gain of traffic channels with the lowest priority.

2. The method of claim 1, wherein the wireless communication system is a code division multiple access system operating according to Telecommunications industry Association standard specified as "IS-95B."

3. The method of claim 1, wherein the wireless communication system is a Third Generation Partnership Projects Universal Mobile Telecommunications System.

4. The method of claim 1, wherein the step of reducing the gain of traffic channels with the lowest priority further comprises the steps of:

(a) sorting the plurality of traffic channels by the determined priority level;

(b) further sorting the plurality of traffic channels by the determined gain;

(c) reducing the gain of the plurality of traffic channels with the highest determined gain;

(d) reducing the spreading rate of the plurality of traffic channels reduced in step (c); and (e) repeating steps (b) through (d) until traffic channel(s) with the highest determined priority level is (are) saved from danger of being dropped or is (are) dropped.

5. The method of claim 4, wherein the wireless communication system is a code division multiple access system operating according to Telecommunications Industry Association standard specified as "IS-95B."

6. The method of claim 4, wherein the wireless communication system is a Third Generation Partnership Projects Universal Mobile Telecommunications System.

7. A computer program embodied on a computer-readable medium for protecting calls in danger of being dropped from a cell of a wireless communication system, the cell having a pilot channel, a plurality of common channels, and a plurality of traffic channels, each of the pilot, common and traffic channels having a gain, a priority level, and a spreading rate, the computer program comprising:

first software that calculates a signal-to-noise ratio as a square of the gain on the pilot channel divided by a sum of the squares of all gains on the common channels and of all gains on the traffic channels;

second software that determines whether the cell is in an overload condition, based upon the signal-to-noise ratio; and third software that in the presence of an overload condition:
 determines the value of the gain associated with each of the
plurality of traffic channels within the cell;
 determines the priority level associated with each of the
plurality of
traffic channels with the cell;
 determines the priority level associated with each of the
plurality of
traffic channels with the cell;
 determines whether each of the plurality of traffic channels
associated with the highest priority is below a maximum gain level; and
 increases the gain of each of the plurality of traffic channels if determined to be below the maximum gain level, otherwise, if no traffic channel is determined to be below the maximum gain level, reducing the gain of traffic channels with the lowest priority.

8. The computer program of claim 7, wherein the wireless communication system is a code division multiple access system operating according to Telecommunications Industry Association standard specified as "IS-95B."

9. The computer program of claim 7, wherein the wireless communication system is a Third Generation Partnership Projects Universal Mobile Telecommunications System.

10. The computer program of claim 7, wherein the third software for reducing the gain of traffic channels with the lowest priority further comprises:

fourth software for:

(a) sorting the plurality of traffic channels by the determined priority level;

(b) further sorting the plurality of traffic channels by the determined gain;

(c) reducing the gain of the plurality of traffic channels with the highest determined gain;

(d) reducing the spreading rate of the plurality of traffic channels reduced in step (c); and (e) repeating steps (b) through (d) until traffic channel (s) with the highest determined priority level is (are) saved from danger of being dropped or is (are) dropped.

11. The computer program of claim 10, wherein the wireless communication system is a code division multiple access system operating according to Telecommunications Industry Association standard specified as "IS-95B."

12. The computer program of claim 10, wherein the wireless communication system is a Third Generation Partnership Projects Universal Mobile Telecommunications System.

13. An apparatus for protecting calls in danger of being dropped from a cell of a wireless communication system, the cell having a pilot channel, a plurality of common channels, and a plurality of traffic channels, each of the pilot, common and traffic channels having a gain, a priority level, and a spreading rate, the apparatus comprising:

a computer processor running control software comprising:

first control software that calculates a signal-to-noise ratio as a square of the gain on the pilot channel divide by a sum of the squares of all gains on the common channels and of all gains on the traffic channels;

second control software that determines whether the cell is in an overload condition, based upon the signal-to-noise ratio;

third control software that determines the value of the gain associated with each of the plurality of traffic channels within the cell;

fourth control software that determines the priority level associated with each of the plurality of traffic channels with the cell;

fifth control software that determines whether each of the plurality traffic channels associated with the highest priority is below a maximum gain level; and sixth control software that increases the gain of each of the plurality of traffic channels if determined to be below the maximum gain level, otherwise, if no traffic channel is determined to be below the maximum gain level, reducing the gain of traffic channels with the lowest priority.

\* \* \* \* \*

UNITED STATES PATENT AND TRADEMARK OFFICE
CERTIFICATE OF CORRECTION

PATENT NO. : 6,775,541 B2
DATED : August 10, 2004
INVENTOR(S) : Dillon et al.

It is certified that error appears in the above-identified patent and that said Letters Patent is hereby corrected as shown below:

Column 7,
Line 32, is "divided a sum", should be -- divided by a sum --

Signed and Sealed this

Twenty-first Day of September, 2004

JON W. DUDAS
*Director of the United States Patent and Trademark Office*